(12) United States Patent
Novak et al.

(10) Patent No.: US 6,327,866 B1
(45) Date of Patent: Dec. 11, 2001

(54) FOOD FREEZING METHOD USING A MULTICOMPONENT REFRIGERANT

(75) Inventors: Richard A. Novak; Gary D. Lang, both of Naperville, IL (US); Arun Acharya, East Amherst, NY (US); John Henri Royal, Grand Island, NY (US); Kenneth Kai Wong, Amherst, NY (US); Bayram Arman, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/605,472

(22) Filed: Jun. 28, 2000

Related U.S. Application Data

(63) Continuation-in-part of application No. 09/222,812, filed on Dec. 30, 1998, now Pat. No. 6,176,102.

(51) Int. Cl.[7] .................. F25B 41/00; C09K 5/00
(52) U.S. Cl. .................................. 62/114; 252/67
(58) Field of Search .............. 62/114, 612, 613, 62/335; 252/67

(56) References Cited

U.S. PATENT DOCUMENTS

| | | |
|---|---|---|
| 4,224,801 | 9/1980 | Tyree, Jr. .................. 62/48 |
| 4,315,409 | 2/1982 | Prentice et al. .............. 62/63 |
| 4,317,665 | 3/1982 | Prentice ....................... 62/63 |
| 4,856,285 | 8/1989 | Acharya et al. .............. 62/63 |
| 4,888,955 | 12/1989 | Tyree, Jr. et al. ........... 62/47.1 |
| 4,953,365 | 9/1990 | Lang et al. .................. 62/381 |
| 5,042,262 | 8/1991 | Gyger et al. .................. 62/64 |
| 5,121,611 | 6/1992 | Broderdorf et al. ......... 62/374 |
| 5,267,449 | 12/1993 | Kiczek et al. ................ 62/86 |
| 5,429,760 | 7/1995 | Doering et al. .............. 252/67 |
| 5,444,985 | 8/1995 | Lang et al. .................... 62/63 |
| 5,551,255 | 9/1996 | Rothfleisch .................. 62/502 |
| 5,650,089 | 7/1997 | Gage et al. .................. 252/67 |
| 5,694,776 | 12/1997 | Sahm ............................ 62/63 |
| 5,706,663 | 1/1998 | Boiarski ...................... 62/114 |
| 5,718,116 | 2/1998 | Grassi et al. ................. 62/62 |
| 5,729,993 | 3/1998 | Boiarski et al. ............ 62/175 |
| 5,779,931 | 7/1998 | Klug et al. .................. 252/67 |
| 5,792,381 | 8/1998 | Gu ............................... 252/67 |
| 5,822,996 | 10/1998 | Sienel et al. ................ 62/114 |

Primary Examiner—Henry Bennett
Assistant Examiner—Chen-Wen Jiang
(74) Attorney, Agent, or Firm—Stanley Ktorides

(57) ABSTRACT

A method for providing refrigeration, such as to an insulated enclosure for food freezing, wherein a defined hydrocarbon-containing multicomponent refrigerant fluid undergoes a phase change coupled with Joule-Thomson expansion to generate refrigeration over a wide temperature range which may comprise from ambient to low temperatures.

18 Claims, 4 Drawing Sheets

FOOD FREEZING METHOD USING A MULTICOMPONENT REFRIGERANT

This appln. is a C-I-P of Ser. No. 09/222,812 filed Dec. 30, 1998, U.S. Pat. No. 6,176,102.

TECHNICAL FIELD

This invention relates generally to refrigeration systems and is particularly advantageous for providing refrigeration to an insulated enclosure such as may be used for food freezing.

BACKGROUND ART

The provision of refrigeration, such as for the cooling and/or freezing of foods or pharmaceuticals, is typically carried out using a mechanical refrigeration system wherein a refrigerant such as ammonia or a freon is employed in a vapor compression cycle. Such systems are effective for providing refrigeration at relatively high temperature levels but to effectively achieve low level temperature refrigeration there generally is required vacuum operation and/or cascading which increases both capital and operating costs.

One method for more effectively providing refrigeration at low temperature levels is to use an expendable cryogenic liquid, such as liquid nitrogen, either separately or in conjunction with a mechanical refrigeration system, to provide the requisite low level refrigeration. However, such systems, while effective, are expensive because of the loss of, and therefore the need for continued replacement of, the cryogenic liquid.

Accordingly, it is an object of this invention to provide a method for providing refrigeration, such as to a heat exchanger or to an insulated enclosure, which can be used to effectively provide such refrigeration, when needed, at a low temperature.

SUMMARY OF THE INVENTION

The above and other objects, which will become apparent to those skilled in the art upon a reading of this disclosure, are attained by the present invention which is:

A method for providing refrigeration comprising:

(A) compressing a multicomponent refrigerant fluid comprising at least one hydrocarbon and at least one component from the group consisting of hydrocarbons, fluorocarbons, hydrofluorocarbons, fluoroethers and atmospheric gases;

(B) cooling and at least partially condensing the compressed multicomponent refrigerant fluid;

(C) expanding the at least partially condensed multicomponent refrigerant fluid to generate refrigeration; and (D) warming and at least partially vaporizing the refrigeration bearing multicomponent refrigerant fluid and employing refrigeration from the multicomponent refrigerant fluid in an enclosure.

As used herein the term "non-toxic" means not posing an acute or chronic hazard when handled in accordance with acceptable exposure limits.

As used herein the term "non-flammable" means either having no flash point or a very high flash point of at least 600° K.

As used herein the term "non-ozone-depleting" means having zero-ozone depleting potential, i.e. having no chlorine, bromine or iodine atoms.

As used herein the term "normal boiling point" means the boiling temperature at 1 standard atmosphere pressure, i.e. 14.696 pounds per square inch absolute.

As used herein the term "indirect heat exchange" means the bringing of fluids into heat exchange relation without any physical contact or intermixing of the fluids with each other.

As used herein the term "expansion" means to effect a reduction in pressure.

As used herein the term "zeotropic" means characterized by a smooth temperature change accompanying a phase change.

As used herein the term "subcooling" means cooling a liquid to be at a temperature lower than that liquid's saturation temperature for the existing pressure.

As used herein the term "low temperature" means a temperature of 250° K. or less, preferably a temperature of 200° K. or less.

As used herein the term "refrigeration" means the capability to reject heat from a subambient temperature system to the surrounding atmosphere.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant is at least 10° C., preferably at least 20° C. and most preferably at least 50° C.

As used herein the term hydrocarbon means one of the following: methane ($CH_4$), ethane ($C_2H_6$), propane ($C_3H_8$), normal butane (n-$C_4H_{10}$), isobutane (i-$C_4H_{10}$), normal pentane (n-$C_5H_{12}$), isopentane (i-$C_5H_{12}$), normal hexane (n-$C_6H_{14}$), normal heptane ($C_7H_{16}$), ethylene ($C_2H_4$), propylene ($C_3H_6$), butylene ($C_4H_8$), hydrogen ($H_2$), methanol ($CH_3OH$), ethanol ($C_2H_5OH$), i-propanol (i-$C_3H_7OH$), n-propanol (n-$C_3H_7OH$), i-butanol (i-$C_4H_9OH$), n-butanol (n-$C_4H_9OH$), 2,2-dimethyl propane (($CH_3)_4$—C), 2,3-dimethyl butane (($CH_3)_2CHCH(CH_3)_2$), 2,2-dimethyl butane ($CH_3CH_2C(CH_3)_3$), 2-methyl pentane ($C_3H_7CH(CH_3)_2$) and 3-ethyl pentane (($C_2H_5)_2CHCH_3$).

As used herein the term "fluorocarbon" means one of the following: tetrafluoromethane ($CF_4$), perfluoroethane ($C_2F_6$), perfluoropropane ($C_3F_8$), perfluorobutane ($C_4F_{10}$), perfluoropentane ($C_5F_{12}$), perfluoroethene ($C_2F_4$), perfluoropropene ($C_3F_6$), perfluorobutene ($C_4F_8$), perfluoropentene ($C_5F_{10}$), hexafluorocyclopropane (cyclo-$C_3F_6$), octafluorocyclobutane (cyclo-$C_4F_8$) and perfluorohexane ($C_6F_{14}$).

As used herein the term "hydrofluorocarbon" means one of the following: fluoroform ($CHF_3$), pentafluoroethane ($C_2HF_5$), tetrafluoroethane ($C_2H_2F_4$), heptafluoropropane ($C_3HF_7$), hexafluoropropane ($C_3H_2F_6$), pentafluoropropane ($C_3H_3F_5$), tetrafluoropropane ($C_3H_4F_4$), nonafluorobutane ($C_4HF_9$), octafluorobutane ($C_4H_2F_8$), undecafluoropentane ($C_5HF_{11}$), methyl fluoride ($CH_3F$), difluoromethane ($CH_2F_2$), ethyl fluoride ($C_2H_5F$), difluoroethane ($C_2H_4F_2$), trifluoroethane ($C_2H_3F_3$), difluoroethane ($C_2H_2F_2$), trifluoroethane ($C_2HF_3$), fluoroethene ($C_2H_3F$), pentafluoropropene ($C_3HF_5$), tetrafluoropropene ($C_3H_2F_4$), trifluoropropene ($C_3H_3F_3$), difluoropropene ($C_3H_4F_2$), heptafluorobutene ($C_4HF_7$), hexafluorobutene ($C_4H_2F_6$), nonafluoropentene ($C_5HF_9$), decafluoropentane ($C_5H_2F_{10}$), undecafluoropentane ($C_5HF_{11}$), hexafluorobutane ($C_4H_4F_6$) and pentafluoroethane ($C_4H_5F_5$).

As used herein the term "fluoroether" means one of the following: trifluoromethyoxy-perfluoromethane ($CF_3$—O—$CF_3$), difluoromethoxy-perfluoromethane ($CHF_2$—O—$CF_3$), fluoromethoxy-perfluoromethane ($CH_2F$—O—$CF_3$), difluoromethoxy-difluoromethane ($CHF_2$—O—$CHF_2$), difluoromethoxy-perfluoroethane ($CHF_2$—O—$C_2F_5$), difluoromethoxy-1,2,2,2-tetrafluoroethane ($CHF_2$—O—$C_2HF_4$), difluoromethoxy-1,1,2,2-tetrafluoroethane ($CHF_2$—O—$C_2HF_4$), perfluoroethoxy-fluoromethane ($C_2F_5$—O—$CH_2F$), perfluoromethoxy-1,1,2-trifluoroethane ($CF_3$—O—$C_2H_2F_3$), perfluoromethoxy-1,2,2-trifluoroethane ($CF_3O$—$C_2H_2F_3$), cyclo-1,1,2,2-tetrafluoropropylether (cyclo-$C_3H_2F_4$—O—), cyclo-1,1,3,3-tetrafluoropropylether (cyclo-$C_3H_2F_4$—O—), perfluoromethoxy-1,1,2,2-tetrafluoroethane ($CF_3$—O—$C_2HF_4$), cyclo-1,1,2,3,3-pentafluoropropylether (cyclo-$C_3H_5$—O—), perfluoromethoxy-perfluoroacetone ($CF_3$—O—$CF_2$—O—$CF_3$), perfluoromethoxy-perfluoroethane ($CF_3$—O—$C_2F_5$), perfluoromethoxy-1,2,2,2-tetrafluoroethane ($CF_3$—O—$C_2HF_4$), perfluoromethoxy-2,2,2-trifluoroethane ($CF_3$—O—$C_2H_2F_3$), cyclo-perfluoromethoxy-perfluoroacetone (cyclo-$CF_2$—O—$CF_2$—O—$CF_2$—), cyclo-perfluoropropylether (cyclo-$C_3F_6$—O—), methoxy-perfluoromethane ($CF_3$—O—$CH_3$), methoxy-perfluoroethane ($C_2F_5$—O—$CH_3$), methoxy-perfluoropropane ($C_3F_7$—O—$CH_3$), methoxy-perfluorobutane ($C_4F_9$—O—$CH_3$), ethoxy-perfluoromethane ($CF_3$—O—$C_2F_5$), ethoxy-perfluoroethane ($C_2F_5$—O—$C_2F_5$), ethoxy-perfluoropropane ($C_3F_7$—O—$C_2F_5$), ethoxy-perfluorobutane ($C_4F_9$—O—$C_2F_5$).

As used herein the term "atmospheric gas" means one of the following: nitrogen ($N_2$), argon (Ar), krypton (Kr), xenon (Xe), neon (Ne), carbon dioxide ($CO_2$), oxygen ($O_2$), helium (He) and nitrous oxide ($N_2O$).

As used herein the term "low-ozone-depleting" means having an ozone depleting potential less than 0.15 as defined by the Montreal Protocol convention wherein dichlorofluoromethane ($CCl_2F_2$) has an ozone depleting potential of 1.0.

DETAILED DESCRIPTION

Figure 1:
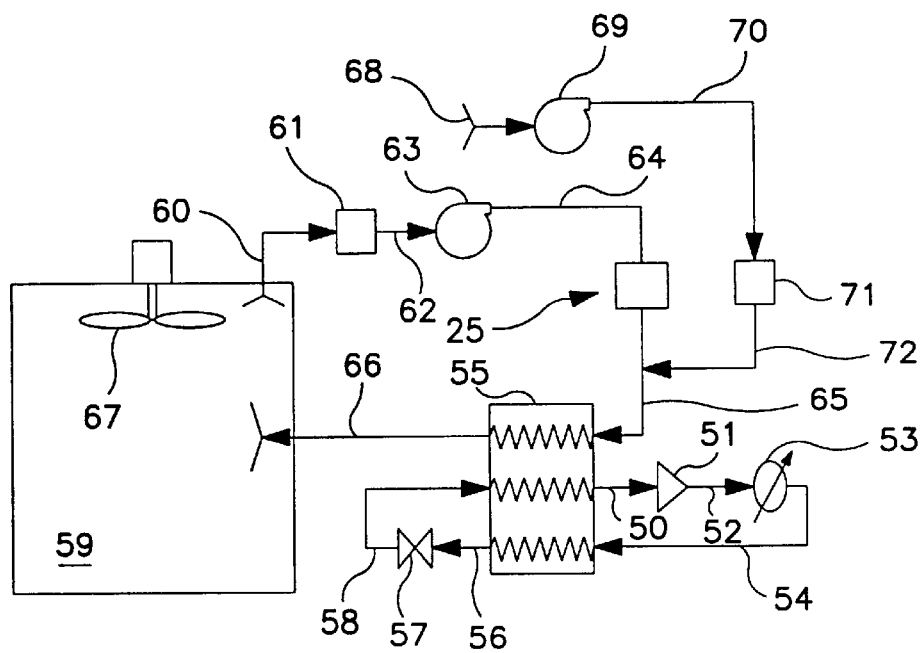
FIG. 1 is a schematic flow diagram of one preferred embodiment of the multicomponent refrigerant refrigeration system of this invention.

The invention comprises, in general, the use of a defined hydrocarbon-containing zeotropic mixed refrigerant to efficiently provide refrigeration over a large temperature range, such as from ambient temperature to a low temperature. The refrigeration may be employed to provide refrigeration directly or indirectly to one or more, preferably insulated, enclosures. The refrigeration may be used to cool, i.e. cool and/or freeze, articles such as food or pharmaceuticals. Such refrigeration can be effectively employed without the need for employing complicated vacuum operation.

The invention may be used to provide refrigeration required for cooling and/or freezing of food and pharmaceutical products, such as air make-up systems, cold room storage, blast freezers, and freezer applications conventionally employing mechanical freezers or cryogenic freezers. The invention may be used to provide refrigeration for all freezer types such as blast room, tunnel (stationary or conveyor), multi-tier, spiral belt, fluidized bed, immersion, plate and contact belt freezers. The invention may also be used for cooling of transport containers, freeze-drying of foods or pharmaceuticals, dry ice production, subcooling of refrigerants, vapor condensation, thermal energy storage systems and cooling of superconductors in generators, motors or transmission lines. The invention may also be used for the production, storage and/or distribution of dry ice.

The multicomponent refrigerant fluid useful in the practice of this invention comprises at least one hydrocarbon and at least one component from the group consisting of hydrocarbons, fluorocarbons, hydrofluorocarbons, fluoroethers and atmospheric gases, in order to provide the required refrigeration at each temperature. The choice of refrigerant components will depend on the refrigeration load versus temperature for the particular process application. Suitable components will be chosen depending upon their normal boiling points, latent heat, and flammability, toxicity, and ozone-depletion potential.

One preferable embodiment of the multicomponent refrigerant fluid useful in the practice of this invention comprises at least one atmospheric gas.

Another preferable embodiment of the multicomponent refrigerant fluid useful in the practice of this invention comprises at least one fluorocarbon.

Another preferable embodiment of the multicomponent refrigerant fluid useful in the practice of this invention comprises at least one hydrofluorocarbon.

Another preferable embodiment of the multicomponent refrigerant fluid useful in the practice of this invention comprises at least one fluoroether.

In one preferred embodiment the multicomponent refrigerant fluid consists solely of hydrocarbons. In another preferred embodiment the multicomponent refrigerant fluid consists solely of hydrocarbons and fluorocarbons. In another preferred embodiment the multicomponent refrigerant fluid consists solely of hydrocarbons, fluorocarbons and hydrofluorocarbons. In another preferred embodiment the multicomponent refrigerant fluid consists solely of hydrocarbons and atmospheric gases. In another preferred embodiment the multicomponent refrigerant fluid consists solely of hydrocarbons, fluorocarbons and fluoroethers. In another preferred embodiment the multicomponent refrigerant fluid consists solely of hydrocarbons, fluorocarbons and atmospheric gases.

The multicomponent refrigerant fluid useful in the practice of this invention may contain other components such as hydrochlorofluorocarbons. Preferably, the multicomponent refrigerant fluid contains no hydrochlorofluorocarbons. Most preferably every component of the multicomponent refrigerant fluid is either a hydrocarbon, fluorocarbon, hydrofluorocarbon, fluoroether or atmospheric gas.

The invention is particularly advantageous for use in efficiently reaching low temperatures from ambient temperatures. Preferred examples of multicomponent refrigerant fluid mixtures useful in the practice of this invention are shown in Tables 1 and 2. The concentration ranges given in Tables 1 and 2 are in mole percent. The example shown in Table 1 is particularly useful in the temperature range of from 175 K to 250 K and the example shown in Table 2 is particularly useful in the temperature range of from 100 K to 250 K

TABLE 1

| COMPONENT | CONCENTRATION RANGE |
|---|---|
| $CH_4$ | 10–70 |
| $C_2H_6$ | 0–40 |
| $C_3H_8$ | 5–40 |
| $n-C_4H_{10}$ | 0–20 |
| $i-C_4H_{10}$ | 0–20 |
| $n-C_5H_{12}$ | 5–20 |
| $i-C_5H_{12}$ | 0–20 |
| $n-C_6H_{14}$ | 0–10 |
| $C_2H_4$ | 0–20 |
| $C_3H_6$ | 0–20 |
| $C_4H_8$ | 0–20 |
| Ar | 0–10 |
| $N_2$ | 0–5 |

TABLE 2

| COMPONENT | CONCENTRATION RANGE |
|---|---|
| $CH_4$ | 5–70 |
| $C_2H_6$ | 0–40 |
| $C_3H_8$ | 5–40 |
| $n-C_4H_{10}$ | 0–20 |
| $i-C_4H_{10}$ | 0–20 |
| $n-C_5H_{12}$ | 5–20 |
| $i-C_5H_{12}$ | 0–20 |
| $n-C_6H_{14}$ | 0–10 |
| $C_2H_4$ | 0–20 |
| $C_3H_6$ | 0–20 |
| $C_4H_8$ | 0–20 |
| Ar | 0–30 |
| $N_2$ | 5–40 |

The invention is especially useful for providing refrigeration over a wide temperature range, particularly one which encompasses low temperatures. In a preferred embodiment of the invention each of the two or more components of the refrigerant mixture has a normal boiling point which differs by at least 5 degrees Kelvin, more preferably by at least 10 degrees Kelvin, and most preferably by at least 20 degrees Kelvin, from the normal boiling point of every other component in that refrigerant mixture. This enhances the effectiveness of providing refrigeration over a wide temperature range, particularly one which encompasses cryogenic temperatures. In a particularly preferred embodiment of the invention, the normal boiling point of the highest boiling component of the multicomponent refrigerant fluid is at least 50° K., preferably at least 100° K., most preferably at least 200° K., greater than the normal boiling point of the lowest boiling component of the multicomponent refrigerant fluid.

The components and their concentrations which make up the multicomponent refrigerant fluid useful in the practice of this invention are such as to form a variable load multicomponent refrigerant fluid and preferably maintain such a variable load characteristic throughout the entire temperature range of the method of the invention. This markedly enhances the efficiency with which the refrigeration can be generated and utilized over such a wide temperature range.

One preferred variable load multicomponent refrigerant fluid useful in the practice of this invention comprises two or more components from the group consisting of $CF_4$, $CH_4$ $C_2H_6$, $C_3H_8$, $n-C_4H_{10}$, $i-C_4H_{10}$, $n-C_5H_{12}$, $i-C_5H_{12}$, $n-C_6H_{14}$, $n-C_7H_{16}$, $C_2H_4$, $C_3H_6$, $C_4H_8$, $O_2$, Ar, $N_2$, Ne and He.

The defined multicomponent refrigerant fluid of the invention is zeotropic. The components have different boiling points to span the entire temperature range of interest so that desired very low temperatures, such as cryogenic temperatures, can be achieved efficiently and generally with only a single stage of compression and without the need for vacuum operation. This contrasts with conventional refrigerants used to provide refrigeration which are composed of single components or blends of two or three components formulated to behave like a single component, i.e. narrow-boiling azeotropic or near-azeotropic blends.

The invention is employed to provide refrigeration to an enclosure, particularly an insulated enclosure. Such insulated enclosure used with the invention is typically a freezer, cold storage container or cold room. It need not be completely closed to the ambient atmosphere. Any insulation means which is effective in reducing heat leak into the container or freezer may be used. Under some limited circumstances, it may be that the subambient temperature facility, such as a cold processing room, is not insulated or is only partially insulated. The invention will be described in greater detail with reference to the Drawings. Referring now to FIG. 1, multicomponent refrigerant fluid 50 is compressed to a pressure generally within the range of from 30 to 1000 pounds per square inch absolute (psia), preferably from 100 to 600 psia, by passage through compressor 51 and resulting compressed multicomponent refrigerant fluid 52 is cooled of the heat of compression by passage through cooler 53. Resulting cooled multicomponent refrigerant fluid 54 is further cooled and at least partially, preferably completely, condensed by passage through heat exchanger 55. Resulting at least partially condensed multicomponent refrigerant fluid 56 is expanded through valve 57 to a pressure generally within the range of from 5 to 100 psia, preferably from 15 to 100 psia, thereby generating refrigeration by the Joule-Thomson effect, i.e. lowering of the fluid temperature due to pressure reduction at constant enthalpy. The expansion of the multicomponent refrigerant fluid through valve 57 may also cause some of the refrigerant fluid to vaporize. The pressure levels employed for the high pressure refrigerant of stream 52 and the low pressure refrigerant of stream 58, and the composition of the refrigerant, are selected to achieve the desired temperature levels at acceptable cost and efficiency.

Refrigeration bearing multicomponent refrigerant fluid 58 is then warmed and vaporized by passage through heat exchanger 55 and then passed as stream 50 to compressor 51 and the cycle begins anew. The warming and vaporization of the refrigeration bearing multicomponent refrigerant fluid in heat exchanger 55 serves to cool by indirect heat exchange refrigerant fluid 54, as was previously described, and also to cool by indirect heat exchange insulated enclosure atmosphere fluid, as will now be described.

A portion of the atmosphere fluid, which is typically air but may be another fluid such as nitrogen, carbon dioxide or any other suitable fluid, is withdrawn from insulated enclosure 59 in stream 60 and passed through separator 61 to remove any entrained ice. Separator 61 may be a centrifugal separator, a filter, or any other suitable separation means.

Ice-free insulated enclosure atmosphere fluid 62 then flows through blower 63 which produces pressurized gas stream 64, generally at a pressure within the range of from 15 to 100 psia, preferably from 16 to 20 psia, and then through purification unit 25. If necessary, additional make up gas may be provided, such as is shown in FIG. 1 by stream 68, compressed in blower 69, passed in stream 70 through purification unit 71 and then as stream 72 combined with stream 64 to form stream 65. Purification units 25 and 71 may be molecular sieve, adsorption bed, or any other suitable means for removing high boiling components such as moisture or carbon dioxide. Alternatively, all of the fluid to be refrigerated may be obtained by means of stream 68 such that fluid removed from enclosure 59 is not recirculated.

Fluid 65 is then passed through heat exchanger 55 wherein it is cooled by indirect heat exchange with the aforesaid warming and vaporizing multicomponent refrigerant fluid resulting in the production of refrigerated insulated enclosure atmosphere fluid 66 which typically has a temperature less than 250° K. and generally will have a temperature within the range of from 100° K. to 250° K. The cooling of the atmosphere or process fluid may include partial or complete liquefaction of the fluid, for example, the production of liquid air. The refrigerated fluid 66 is then passed into insulated enclosure 59 wherein the refrigeration within fluid 66 is employed. If desired, insulated enclosure 59 may be equipped with a fan 67 or other atmosphere circulation device to assist in more evenly distributing the refrigeration within the enclosure and for enhancing the heat transfer characteristics of the refrigerated fluid.

Figure 2:
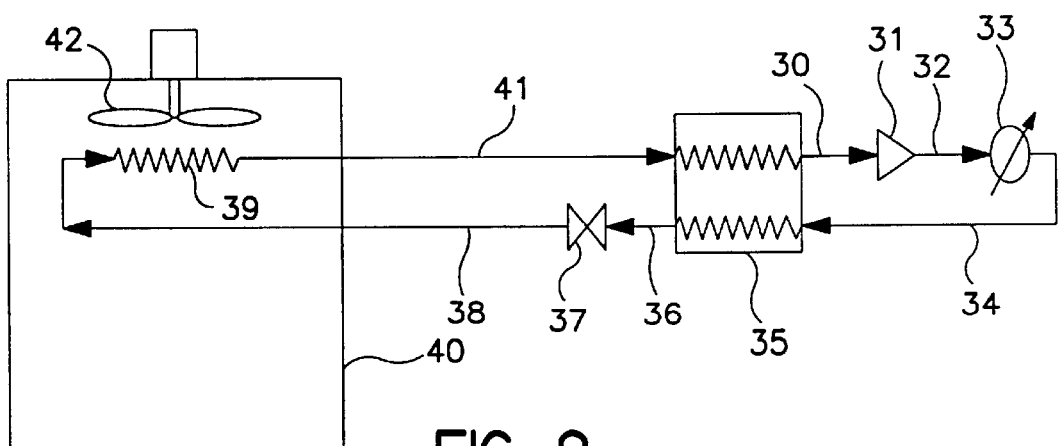
FIG. 2 is a schematic flow diagram of another preferred embodiment of the multicomponent refrigerant refrigeration system of this invention.

FIG. 2 illustrates another embodiment of the invention wherein the heat exchange between the warming multicomponent refrigerant fluid and the cooling insulated enclosure atmosphere fluid occurs within the insulated enclosure. Referring now to FIG. 2, multicomponent refrigerant fluid 30 is compressed to a pressure generally within the range of from 30 to 1000 psia, preferably from 100 to 600 psia, by passage through compressor 31, and resulting compressed multicomponent refrigerant fluid 32 is cooled of the heat of compression by passage through cooler 33. Resulting cooled multicomponent refrigerant fluid 34 is further cooled and at least partially, preferably completely, condensed by passage through heat exchanger 35. Resulting at least partially condensed multicomponent refrigerant fluid 36 is expanded through valve 37 to a pressure within the range of from 5 to 100 psia, preferably 15 to 100 psia, thereby generating refrigeration by the Joule-Thomson effect. Refrigeration bearing multicomponent refrigerant fluid 38, which may be a two-phase stream, is then passed into insulated enclosure 40.

The passage of refrigeration bearing multicomponent refrigerant fluid within insulated enclosure 40 includes passage through heat exchange coils 39 or other suitable heat exchange means wherein the refrigeration bearing multicomponent refrigerant fluid is warmed and vaporized by indirect heat exchange with the insulated enclosure atmosphere fluid. If desired, the refrigeration bearing refrigerant fluid may be injected into the enclosure so that the heat exchange with the insulated enclosure atmosphere fluid is by direct heat exchange. The resulting refrigerated insulated enclosure atmosphere fluid is then employed throughout insulated enclosure 40, preferably with the assistance of fluid flow enhancement means such as fan 42, thereby providing refrigeration to the insulated enclosure. Resulting warmed multicomponent refrigerant fluid 41 is passed out of insulated enclosure 40 and further warmed and completely vaporized, if not already so, by passage through heat exchanger 35 to effect the cooling by indirect heat exchange of stream 34 as was previously described, and resulting warmed fluid is passed out of heat exchanger 35 in stream 30 for passage to compressor 31 wherein the cycle begins anew.

Figure 3:
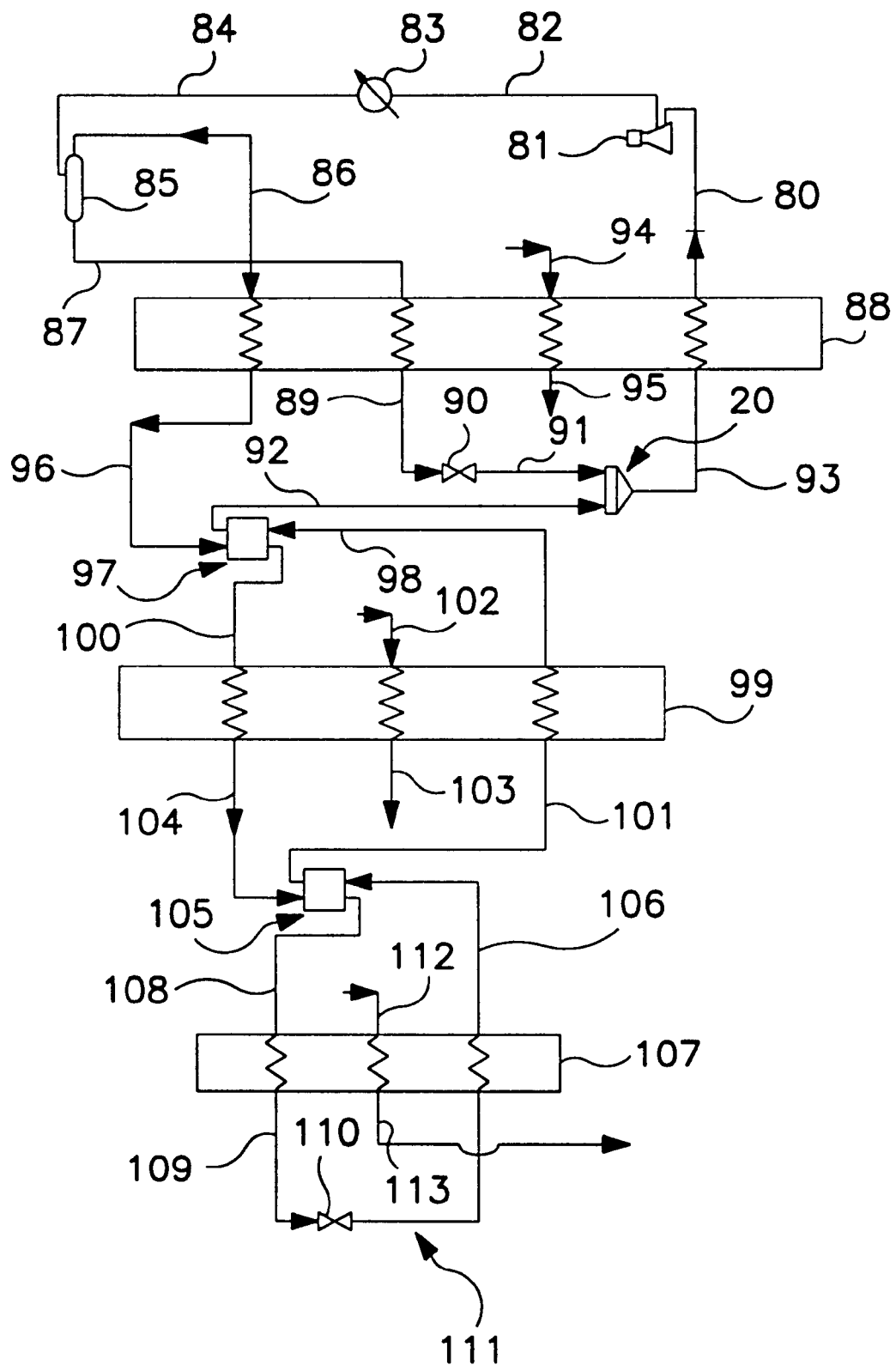
FIG. 3 is a schematic flow diagram of another preferred embodiment of the invention wherein multiple level refrigeration is provided.

FIG. 3 illustrates another embodiment of the invention wherein the multicomponent refrigerant fluid may be used to provide refrigeration at more than one temperature level and thus can provide refrigeration to insulated enclosure atmosphere fluid which may be used within different enclosures calling for different levels of refrigeration or at different temperature levels within a single enclosure.

Referring now to FIG. 3, multicomponent refrigerant fluid 80 is compressed by passage through compressor 81 to a pressure generally within the range of from 30 to 600 psia and resulting compressed multicomponent refrigerant fluid 82 is cooled and partially condensed by passage through cooler 83. Two-phase multicomponent refrigerant fluid from cooler 83 is passed in stream 84 to phase separator 85 wherein it is separated into vapor and liquid portions. Since multicomponent refrigerant fluid 80 is a zeotropic mixture, the compositions of the vapor and liquid portions differ. Preferably the liquid portion contains substantially all of the highest boiling component of multicomponent refrigerant fluid 80 and the vapor portion contains substantially all of the lowest boiling component of multicomponent refrigerant fluid 80.

The liquid portion of the multicomponent refrigerant fluid is passed from phase separator 85 in stream 87 through heat exchanger 88 wherein it is subcooled. Resulting subcooled liquid stream 89 is expanded through valve 90 to generate refrigeration by the Joule-Thomson effect. Resulting refrigeration bearing multicomponent refrigerant fluid 91, which is generally at a pressure within the range of from 15 to 100 psia, is passed through mixing device 20 and then in stream 93 through heat exchanger 88 wherein it is warmed and completely vaporized by indirect heat exchange with insulated enclosure atmosphere fluid and then passed in stream 80 to compressor 81 for a new cycle. The insulated enclosure atmosphere fluid is passed to heat exchanger 88 in stream 94 and the resulting refrigerated insulated enclosure atmosphere fluid, generally at a temperature within the range of from 20° F. to 40° F., is passed in stream 95 from heat exchanger 88 to an insulated enclosure (not shown) wherein the refrigeration within stream 95 is provided and employed.

The vapor portion of the multicomponent refrigerant fluid is passed from phase separator 85 in stream 86 through heat exchanger 88 wherein it is cooled by indirect heat exchange with warming fluid in stream 93, and then passed in stream 96 to intermediate heat exchanger 97 for further cooling and then in stream 100 through heat exchanger 99 wherein it is at least partially condensed. Resulting multicomponent fluid is passed from heat exchanger 99 in stream 104 through heat exchanger 105 for further cooling and condensation and then in stream 108 through heat exchanger 107 wherein it is completely condensed, if not completely condensed already, and subcooled.

Subcooled multicomponent refrigerant liquid stream 109 is expanded through valve 110 to generate refrigeration by the Joule-Thomson effect and resulting refrigeration bearing multicomponent refrigerant fluid 111, which may be a two-phase stream, is warmed and preferably at least partially vaporized by passage through heat exchanger 107, thereby serving to cool by indirect heat exchange aforesaid steam 108 as well as insulated enclosure atmosphere fluid which is passed to heat exchanger 107 in stream 112. The resulting refrigerated insulated enclosure atmosphere fluid, generally at a temperature within the range of from −30° F. to −50° F., is passed in stream 113 from heat exchanger 107 to an insulated enclosure (not shown) wherein the refrigeration within stream 113 is provided and employed.

Warmed multicomponent refrigerant fluid is passed from heat exchanger 107 in stream 106 through heat exchanger 105 wherein it is further warmed and from there in stream 101 through heat exchanger 99 wherein it is further warmed and preferably further vaporized by indirect heat exchange with aforesaid cooling stream 100 and also with insulated enclosure atmosphere fluid which is passed to heat exchanger 99 in stream 102. The resulting refrigerated insulated enclosure atmosphere fluid, generally at a temperature within the range of from 0° F. to −20° F., is passed in stream 103 from heat exchanger 99 to an insulated enclosure (not shown) wherein the refrigeration within stream 103 is provided and employed. The resulting further warmed multicomponent refrigerant fluid is passed from heat exchanger 99 in stream 98 through heat exchanger 97 and then as stream 92 to mixer 20 wherein it mixes with stream 91 to form stream 93 for further processing as previously described.

Figure 4:
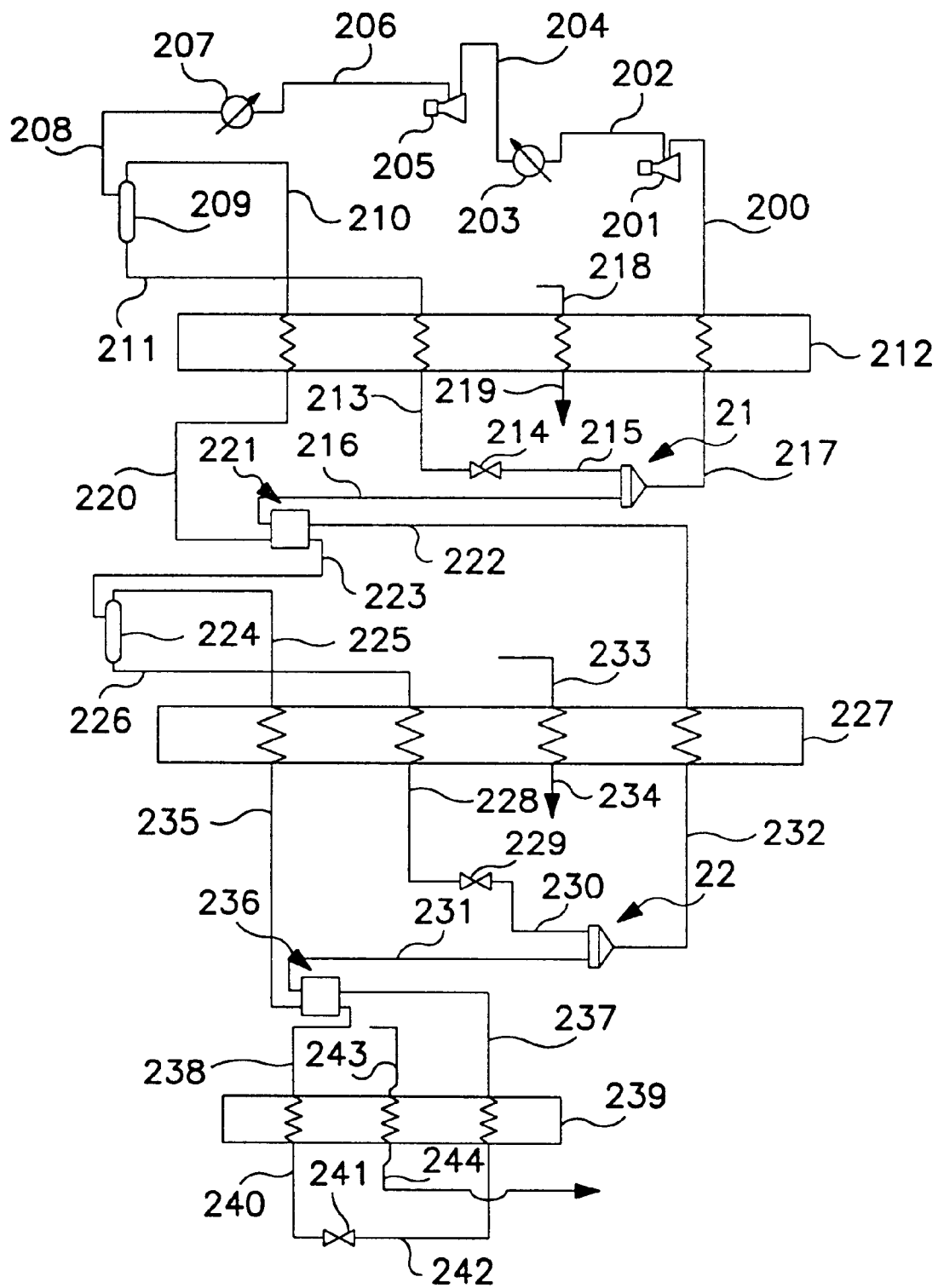
FIG. 4 is a schematic flow diagram of another preferred embodiment of the invention wherein multiple level refrigeration is provided and there is more than one phase separation.

FIG. 4 illustrates another preferred embodiment of the invention wherein the multicomponent refrigerant fluid is used to provide refrigeration at more than one temperature level and thus can provide refrigeration to more than one insulated enclosure. The embodiment of the invention illustrated in FIG. 4 employs more than one phase separation of the multicomponent refrigerant fluid.

Referring now to FIG. 4, multicomponent refrigerant fluid 200 is compressed by passage through compressor 201 to a pressure generally within the range of from 30 to 300 psia, and resulting compressed multicomponent refrigerant fluid 202 is cooled of the heat of compression by passage through cooler 203. Resulting multicomponent refrigerant fluid 204 is further compressed by passage through compressor 205 to a pressure generally within the range of from 60 to 600 psia, and resulting compressed multicomponent refrigerant fluid 206 is cooled and partially condensed by passage through cooler 207. Two-phase multicomponent refrigerant fluid from cooler 207 is passed in stream 208 to phase separator 209 wherein it is separated into vapor and liquid portions. Since multicomponent refrigerant fluid 200 is a zeotropic mixture, the composition of these vapor and liquid portions differ. Preferably, the liquid portion contains substantially all of the highest boiling component of multicomponent refrigerant fluid 200 and the vapor portion contains substantially all of the lowest boiling component of multicomponent refrigerant fluid 200.

The liquid portion of the multicomponent refrigerant fluid is passed from phase separator 209 in stream 211 through heat exchanger 212 wherein it is subcooled. Resulting subcooled liquid stream 213 is expanded through valve 214 to generate refrigeration by the Joule-Thomson effect. Resulting refrigeration bearing multicomponent refrigerant fluid 215, which is generally at a pressure within the range of from 15 to 100 psia, is passed through mixing device 21 and then in stream 217 through heat exchanger 212 wherein it is warmed and completely vaporized by indirect heat exchange with insulated enclosure atmosphere fluid and then passed in stream 200 to compressor 201 for a new cycle. The insulated enclosure atmosphere fluid, is passed to heat exchanger 212 in stream 218 and the resulting refrigerated insulated enclosure atmosphere fluid, generally at a temperature within the range of from 30° F. to 60° F., is passed in stream 219 from heat exchanger 212 to an insulated enclosure (not shown) wherein the refrigeration within stream 219 is provided and employed.

The vapor portion of the multicomponent refrigerant fluid is passed from phase separator 209 in stream 210 through heat exchanger 212 wherein it is cooled by indirect heat exchange with warming fluid in stream 217 and then passed in stream 220 to intermediate heat exchanger 221 for further cooling. In one or both of the cooling steps in heat exchanger 212 and 221 a portion of the multicomponent refrigerant fluid is condensed so that multicomponent refrigerant fluid 223 from heat exchanger 221 is a two-phase stream. Stream 223 is passed to phase separator 224 wherein it is separated into vapor and liquid portions.

The liquid portion from phase separator 224 is passed in stream 226 through heat exchanger 227 wherein it is subcooled. Resulting subcooled liquid stream 228 is expanded through valve 229 to generate refrigeration by the Joule-Thomson effect. Resulting refrigeration bearing multicomponent refrigerant fluid 230, which is generally at a pressure within the range of from 15 to 100 psia, is passed though mixing device 22 and then in stream 232 through heat exchanger 227 wherein it is warmed and vaporized by indirect heat exchange with insulated enclosure atmosphere fluid. The insulated enclosure atmosphere fluid is passed to heat exchanger 227 in stream 233 and the resulting refrigerated insulated enclosure atmosphere fluid, generally at a temperature within the range of from −70° F. to −110° F., is passed in stream 234 from heat exchanger 227 to an insulated enclosure (not shown) wherein the refrigeration within stream 234 is provided and employed. Warmed multicomponent refrigerant fluid from heat exchanger 227 is passed in stream 222 through heat exchanger 221 for warming by indirect heat exchange with cooling stream 220 and from there in stream 216 to mixer 21 wherein it mixes with stream 215 to form stream 217 for further processing as previously described.

The vapor portion from phase separator 224 is passed from phase separator 224 in stream 225 through heat exchanger 227 wherein it is cooled by indirect heat exchange with warming fluid in stream 232 and then passed in stream 235 to heat exchanger 236 for further cooling. In the course of the cooling through heat exchangers 227 and 236 this vapor portion is condensed so that multicomponent refrigerant fluid 238 from heat exchanger 236 is a liquid stream. Stream 238 is subcooled by passage through heat exchanger 239 and resulting subcooled liquid stream 240 is expanded through valve 241 to generate refrigeration by the Joule-Thomson effect and resulting refrigeration bearing multicomponent refrigerant fluid 242, which may be a two-phase stream, is warmed and preferably at least partially vaporized by passage through heat exchanger 239, thereby serving to cool by indirect heat exchange aforesaid subcooling stream 238 as well as insulated enclosure atmosphere fluid which is passed to heat exchanger 239 in stream 243. The resulting refrigerated insulated enclosure atmosphere fluid, generally at a temperature within the range of from −150° F. to −330° F., is passed in stream 244 from heat exchanger 239 to an insulated enclosure (not shown) wherein the refrigeration within stream 244 is provided and employed.

Warmed multicomponent refrigerant fluid is passed from heat exchanger 239 in stream 237 through heat exchanger 236 wherein it is further warmed and from there in stream 231 to mixer 22 wherein it mixes with stream 230 to form stream 232 for further processing as previously described.

In a further embodiment of the invention, waste heat from the refrigerant cycle may be used to provide heat to the same or a different facility that employs the refrigeration. For example, heat rejected in coolers 203 and 207 of the embodiment illustrated in FIG. 4 may be used to heat boiler feed water.

Figure 5:
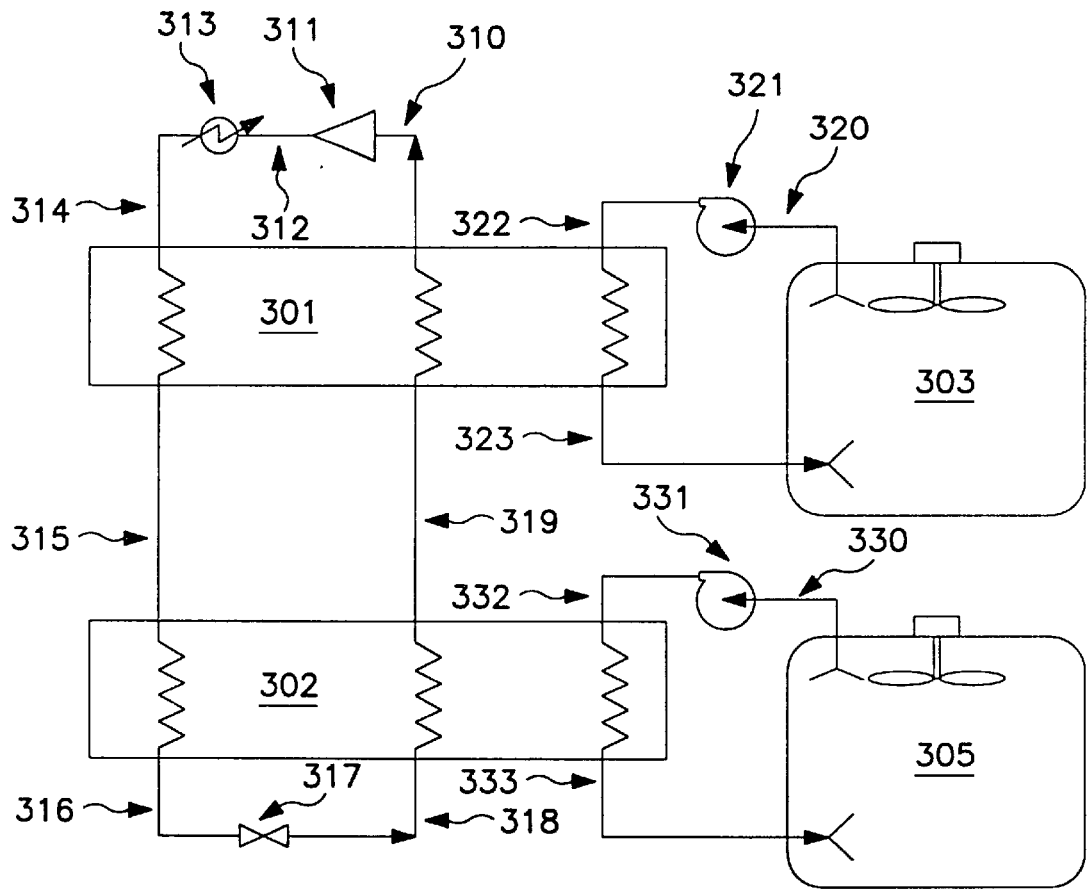
FIG. 5 is a schematic flow diagram of another preferred embodiment of the invention for use with multiple enclosures.

FIG. 5 illustrates another embodiment of the invention employing multiple enclosures with a single multicomponent refrigerant fluid system. Referring now to FIG. 5, multicomponent refrigerant fluid 310 is compressed by passage through compressor 311 and resulting compressed multicomponent refrigerant fluid 312 is cooled of the heat of compression in aftercooler 313 to produce fluid 314. Multicomponent refrigerant fluid in stream 314 is then cooled by passage through heat exchanger 301 and resulting cooled multicomponent refrigerant fluid 315 is further cooled by passage through heat exchanger 302 to produce further cooled multicomponent refrigerant fluid 316. Multicomponent refrigerant fluid 316 undergoes Joule-Thomson expansion through valve 317 and resulting refrigeration bearing multicomponent refrigerant fluid 318 is warmed by passage though heat exchanger 302 to effect by indirect heat exchange the aforesaid further cooling of stream 315, as well as the cooling of stream 332 as will be further described below. Resulting warmed multicomponent refrigerant fluid stream 319 is further warmed by passage through heat exchanger 301 to effect by indirect heat exchange the aforesaid cooling of stream 314, as well as the cooling of stream 322 as will be further described below. The resulting further warmed multicomponent refrigerant fluid is passed from heat exchanger 302 as stream 310 to compressor 311 and the cycle starts anew.

Atmosphere fluid from enclosure 303 is passed in stream 320 to blower 321 and from there as stream 322 through heat exchanger 301 wherein it is cooled by indirect heat exchange with the aforesaid further warming refrigeration bearing multicomponent refrigerant fluid. Resulting cooled fluid stream 323 is passed back into enclosure 303 wherein the refrigeration generated by the multicomponent refrigerant fluid is employed. Atmosphere fluid from enclosure 305 is passed in stream 330 to blower 331 and from there as stream 332 through heat exchanger 302 wherein it is cooled by indirect heat exchange with the aforesaid warming refrigeration bearing multicomponent refrigerant fluid. Resulting cooled fluid stream 333 is passed back into enclosure 305 wherein the refrigeration generated by the multicomponent refrigerant fluid is employed.

Although the multicomponent refrigerant flow circuit described in the Drawings is a closed loop single flow cycle, it may be that various other flow circuits are utilized for some applications. Thus the refrigerant flow circuits could include liquid recycle, i.e. phase separation of the refrigerant fluid with liquid rewarming and further cooling of the separated vapor. Such internal liquid recycle serves to provide refrigerant mixture process flexibility and can avoid liquid freezing concerns. Also, for some cases, such as very low required temperatures or multiple enclosures, it may be desirable to utilize multiple flow circuits for the refrigerant system. For each case, each separate circuit would provide refrigeration over a given temperature range and the combined circuits would provide efficient refrigeration over the entire temperature range.

Now by the use of this invention one can more effectively provide refrigeration to an insulated enclosure especially where refrigeration is required over a larger temperature range such as from an ambient to a cryogenic temperature. Although the invention has been described in detail with reference to certain preferred embodiments those skilled in the art will recognize that there are other embodiments of the invention within the spirit and the scope of the claims.

What is claimed is:

1. A method for providing refrigeration comprising:

(A) compressing a multicomponent refrigerant fluid comprising at least one hydrocarbon and at least one component from the group consisting of hydrocarbons, fluorocarbons, hydrofluorocarbons, fluoroethers and atmospheric gases;

(B) cooling and at least partially condensing the compressed multicomponent refrigerant;

(C) expanding the at least partially condensed multicomponent refrigerant fluid to generate refrigeration; and (D) warming and at least partially vaporizing the refrigeration bearing multicomponent refrigerant fluid and employing refrigeration from the multicomponent refrigerant fluid in an insulated enclosure wherein the warming and at least partially vaporizing of refrigeration bearing multicomponent refrigerant fluid is by heat exchange with insulated enclosure atmosphere fluid to produce refrigerated insulated enclosure atmosphere fluid and further comprising (E) employing the refrigerated insulated enclosure atmosphere fluid within an insulated enclosure to provide refrigeration to the insulated enclosure.

2. The method of claim 1 wherein the refrigeration is employed for cooling or freezing food.

3. The method of claim 1 wherein the refrigeration is employed for cooling or freezing pharmaceuticals.

4. The method of claim 1 wherein the refrigeration is employed in the enclosure using at least one intermediate heat exchange step.

5. The method of claim 1 wherein the heat exchange between the refrigeration bearing multicomponent refrigerant fluid and the insulated enclosure atmosphere fluid takes place outside the insulated enclosure.

6. The method of claim 1 wherein the heat exchange between the refrigeration bearing multicomponent refrigerant fluid and the insulated enclosure atmosphere fluid takes place within the insulated enclosure.

7. The method of claim 1 wherein the cooling of the multicomponent refrigerant fluid in step (B) partially condenses the multicomponent refrigerant fluid and the resulting liquid is employed to carry to steps (C), (D) and (E); further comprising (F) cooling the resulting vapor to produce cooled fluid, expanding the cooled fluid to generate refrigeration, and warming the resulting refrigeration bearing fluid to produce refrigerated fluid for use in an insulated enclosure.

8. The method of claim 7 wherein the insulated enclosure of step (F) is different from the insulated enclosure of step (E).

9. The method of claim 1 wherein the cooling of the multicomponent refrigerant fluid in step (B) partially condenses the multicomponent refrigerant fluid and the resulting liquid is employed to carry out steps (C), (D) and (E); further comprising (G) partially condensing the resulting vapor to produce a liquid fluid and a vapor fluid, expanding the liquid fluid to generate refrigeration and warming the resulting refrigeration bearing liquid fluid to produce refrigerated fluid for use in an insulated enclosure; and (H) at least partially condensing the vapor fluid and expanding the at least partially condensed fluid to generate refrigeration, and warming the resulting refrigeration bearing fluid to produce refrigerated fluid for use in an insulated enclosure.

10. The method of claim 9 wherein each of the insulated enclosures of steps (E), (G) and (H) are different insulated enclosures.

11. The method of claim 1 wherein each of the components of the multicomponent refrigerant fluid has a normal boiling point which differs by at least 5 degrees Kelvin from the normal boiling point of each of the other components of the multicomponent refrigerant fluid.

12. The method of claim 1 wherein the normal boiling point of the highest boiling component of the multicomponent refrigerant fluid is at least 50 degrees Kelvin greater than the normal boiling point of the lowest boiling component of the multicomponent refrigerant fluid.

13. The method of claim 1 wherein the refrigeration from the multicomponent refrigerant fluid is employed to at least partially liquefy a fluid.

14. The method of claim 1 further comprising recovering heat from the cooling of the compressed multicomponent refrigerant fluid.

15. The method of claim 1 wherein the multicomponent refrigerant fluid consists solely of hydrocarbons.

16. The method of claim 1 wherein the multicomponent refrigerant fluid comprises at least one atmospheric gas.

17. The method of claim 1 wherein every component of the multicomponent refrigerant fluid is either a hydrocarbon, fluorocarbon, hydrofluorocarbon, fluoroether or atmospheric gas.

18. The method of claim 1 wherein the multicomponent refrigerant fluid comprises at least two components from the group consisting of $CH_4$, $C_2H_6$, $C_3H_8$, $n\text{-}C_4H_{10}$, $i\text{-}C_4H_{10}$, $n\text{-}C_5H_{12}$, $i\text{-}C_5H_{12}$, $n\text{-}C_6H_{14}$, $n\text{-}C_7H_{16}$, $C_2H_4$, $C_3H_6$, $C_4H_8$, $CF_4$, $O_2$, Ar, $N_2$, Ne and He.

* * * * *